July 7, 1964 W. C. HEITHAUS ETAL 3,140,457

GRADIATED MAGNETIC FLUX PATH PRODUCED BY PLURALITY OF TRANSVERSE DUCTS

Filed May 28, 1962 2 Sheets-Sheet 1

INVENTORS
WILLIAM C. HEITHAUS
CHARLES D. SCHWEBEL
BY S. C. Yeaton
ATTORNEY

July 7, 1964 W. C. HEITHAUS ETAL 3,140,457

GRADIATED MAGNETIC FLUX PATH PRODUCED BY PLURALITY OF TRANSVERSE DUCTS

Filed May 28, 1962 2 Sheets-Sheet 2

INVENTORS
WILLIAM C. HEITHAUS
CHARLES D. SCHWEBEL
BY S. C. Yeaton
ATTORNEY

United States Patent Office 3,140,457
Patented July 7, 1964

3,140,457

GRADIATED MAGNETIC FLUX PATH PRODUCED BY PLURALITY OF TRANSVERSE DUCTS

William C. Heithaus, Dunedin, and Charles D. Schwebel, Cocoa Beach, Fla., assignors to Sperry Rand Corporation, Great Neck, N.Y., a corporation of Delaware Filed May 28, 1962, Ser. No. 198,305
10 Claims. (Cl. 333—24.1)

This invention relates to magnetic circuits and more specifically to means for producing a gradient in the magnetic flux density in an air gap.

It is frequently necessary to provide a non-uniform flux in a magnetic air gap. One way of achieving this has been to shape the external dimensions of magnetic pole pieces. However, in many applications, it is necessary that the external pole piece be flat or regular in shape so that externally shaped pole faces cannot be tolerated.

It is an object of the present invention to provide means for obtaining a specific non-uniform magnetic field in an air gap formed by parallel pole pieces.

It is another object of the present invention to provide means for broadbanding microwave components that employ gyromagnetic materials.

It is still another object of the present invention to provide an efficient yet compact means for cooling microwave components that employ magnetically biased gyromagnetic materials.

These and other objects will become more readily apparent from the following description when read in connection with the accompanying drawings.

Figure 1:
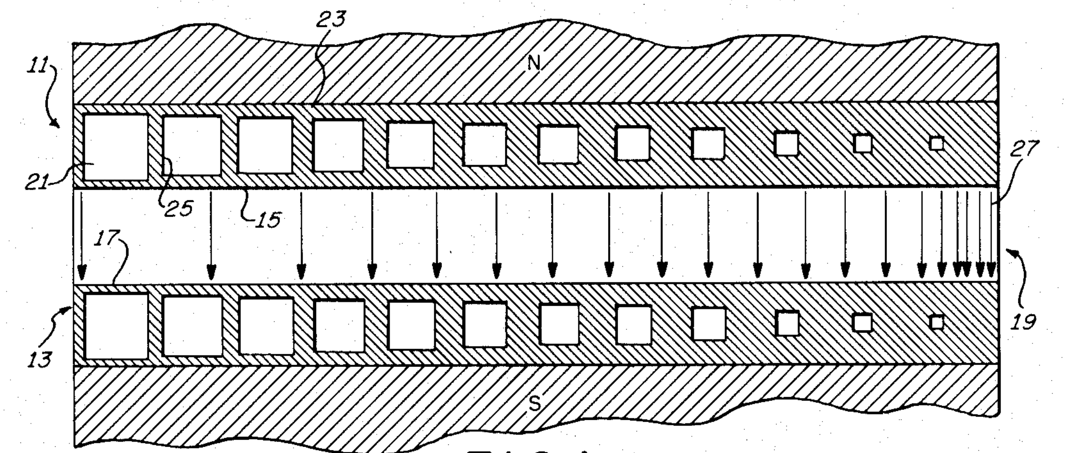
Figure 2:
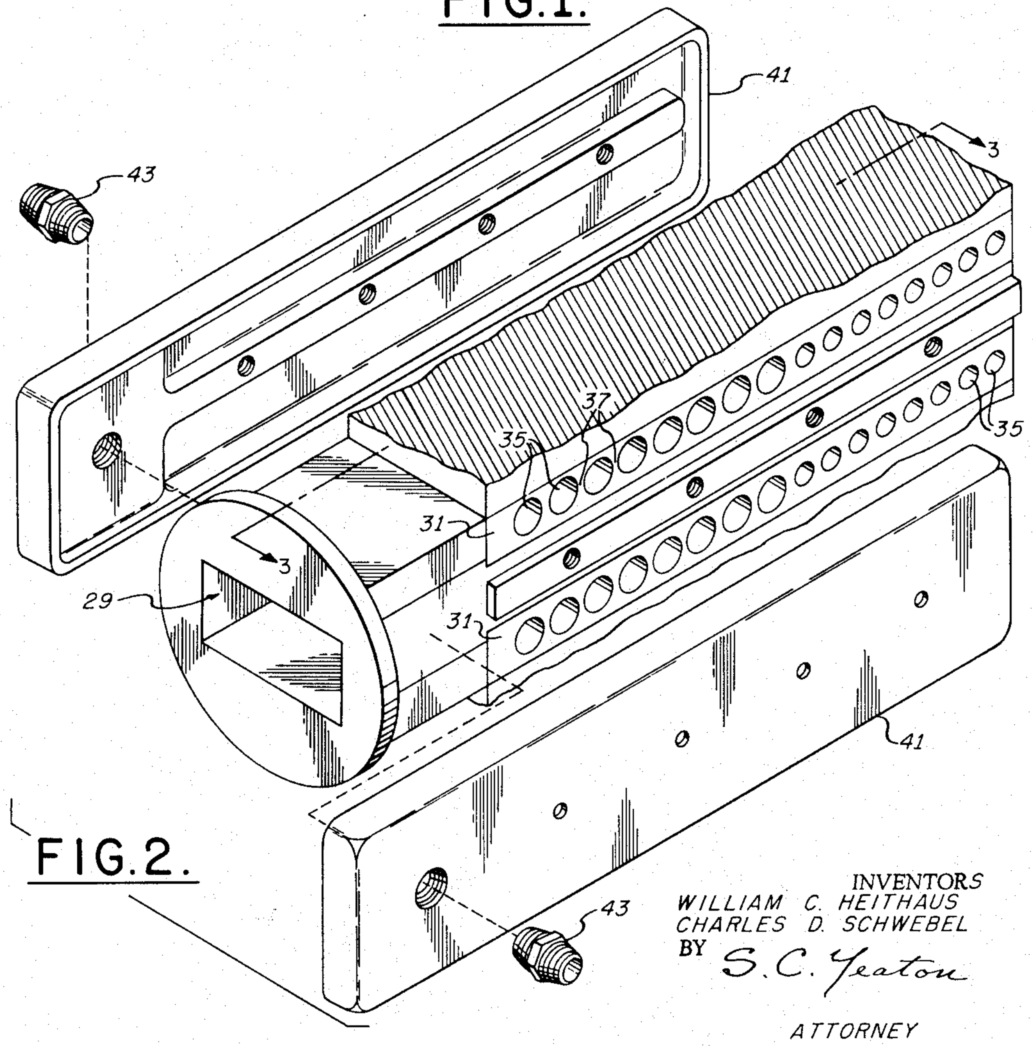
Figure 3:
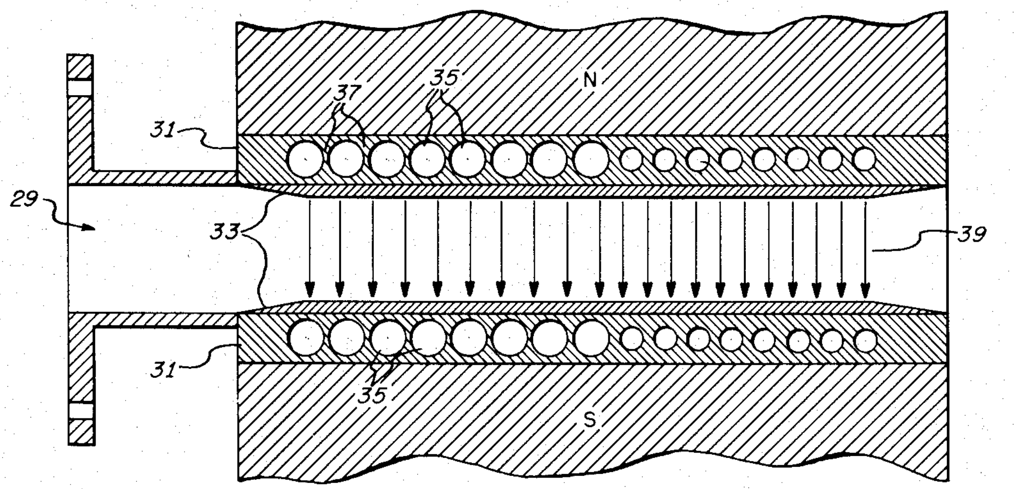
Figure 4:
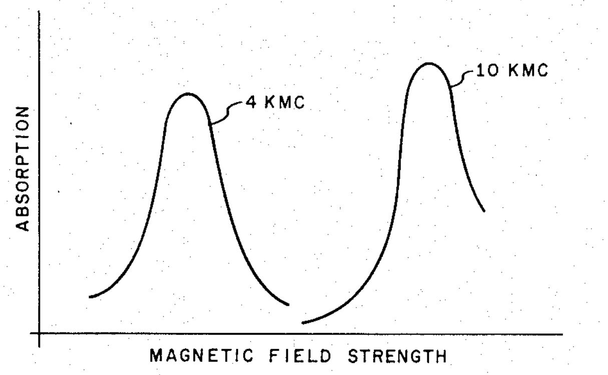

FIG. 1, given for purposes of illustration, is a cross sectional view of magnetic pole pieces constructed in accordance with the principles of the present invention and showing typical magnetic flux paths, FIG. 2 is an exploded perspective view, partly in cross section, showing a microwave harmonic suppressor embodying the principles of the invention, FIG. 3 is a cross sectional view taken along line 3—3 of FIG. 2. Magnetic flux vectors are included for purposes of illustration, and FIG. 4, given for purposes of illustration, is a graphical and qualitative representation of the absorption of microwave energy by a typical gyromagnetic material.

Referring more particularly to FIG. 1, there is shown a cross sectional view of a magnetic air gap embodying the principles of the present invention. A pair of magnetic pole pieces 11 and 13 are disposed near each other. The pole pieces 11 and 13 can be fabricated from any material having a magnetic permeability different from the permeability of air. These pole pieces can conveniently be fabricated from any of the commercial ferromagnetic materials such as soft iron. The transverse flat faces 15 and 17 are parallel and form the air gap 19. A source of magnetomotive force (not shown) terminates in the N and S poles as illustrated.

The pole pieces are provided with a series of ducts 21 so as to form a shell 23 and separating web members 25.

The cross section of the ducts 21 has been illustrated as rectangular. However, any other convenient shape such as a circular cross section can be used.

The magnetomotive force applied across the air gap establishes a field of magnetic flux as indicated by the vectors 27.

The flux density in an air gap is dependent upon the reluctance of the entire magnetic circuit. Since the pole pieces employed in the present invention form part of the magnetic circuit, the reluctance of these elements can exert a considerable influence over the flux density in the air gap. If the pole pieces are made so as to exhibit different reluctances in various locations through their cross section, this difference in the reluctance will produce a difference in flux density in the corresponding section of the air gap.

The difference in reluctance is achieved in the present invention by adjusting the combination of size and spacing of the ducts 21.

The pole pieces are traversed by the same total number of flux lines as the air gap. These flux lines are distributed through the pole pieces so as to encounter the least reluctance. Assuming that the material comprising the pole pieces is ferromagnetic and thus has a lower reluctance than air, the flux lines will tend to distribute themselves around the ducts and to remain in the magnetic web material as much as possible. Since the reluctance of any section of the pole pieces is an inverse function of the cross sectional area of the web material, sections of the pole pieces in which the ducts are large and closely spaced provide a relatively high reluctance with a correspondingly low flux density in that portion of the air gap which is in series with the high reluctance path. This effect is enhanced in the case of ferromagnetic pole pieces since the permeability of such materials is dependent upon the flux passing through the material. If the ducts 21 are sufficiently large and closely spaced, the flux lines are crowded into the adjacent web members. This crowding forces the metal in the web between the ducts to operate at a much higher flux density than it would if the ducts were not present. When the crowding is sufficient, the metal in the web becomes saturated. Its permeability decreases and its reluctance increases. The amount of crowding of the flux lines in the web is controlled by the size and spacing of the ducts. The flux density will be lowered in that part of the air gap in series with the web having the increased reluctance. A predetermined transverse gradient in air gap flux density can be obtained by fabricating the web thicknesses so as to provide a graduated reluctance. Reluctance in the webs can be caused to vary from that of unsaturated iron to that of air, with a corresponding degree of control over the flux density in the air gap.

FIGS. 2 and 3 depict a microwave harmonic suppressor utilizing the principles of the present invention. A waveguide 29 serves to convey microwave energy to the suppressor. A pair of magnetically permeable pole pieces 31 are arranged so that their inner surfaces form the broad walls of the waveguide 29. A pair of gyromagnetic elements 33 line the broad walls of the waveguide. Such gyromagnetic elements comprise magnetically polarized elements of material exhibiting the gyromagnetic effect at wave frequencies within the operating range of frequencies. The pole pieces contain a plurality of ducts 35 separated by the web members 37. Two different sizes and spacings of ducts are illustrated, however it is to be realized that any practical variety of sizes and spacings of ducts may be utilized as dictated by the requirements of a particular application. A source of magnetomotive force terminates in the N and S poles illustrated.

Magnetic flux is established across the narrow dimension of waveguide 29 as indicated by the vectors 39. The ducts nearer the input of the waveguide 29 are large and closely spaced so as to provide a low magnetic flux density in this region. However, the ducts farther from the input of waveguide 29 are relatively small and widely spaced so as to provide a relatively high flux density in the adjacent air gap.

In a practical embodiment of the invention, the ducts may serve also as passageways for a coolant when combined with a circulating means such as the manifolds 41 and the nipples 43.

The principles underlying the present invention permit the construction of unusually efficient cooling systems in such circumstances. Ordinarily, the energy to be absorbed is contained principally in the lower-ordered harmonics. Consequently, the greatest cooling effect is required in areas in which these lower-ordered harmonics are to be absorbed. However, the harmonic suppressor constructed according to the principles of the present invention contains the larger ducts in these regions. Thus, the coolant flow can be concentrated in the regions in which it is most needed.

The operation of the harmonic mode suppressor is best understood by first referring to FIG. 4 which is a qualitative representation of the microwave absorption characteristics of a typical gyromagnetic material. If a gyromagnetic material is immersed in a steady magnetic field, and then an alternating magnetic field is applied in a direction perpendicular to the steady field, energy will be absorbed from the alternating field and dissipated in the form of heat. The absorption will reach a maximum at a frequency corresponding to ferromagnetic resonance. The relationship between resonance frequency and the strength of the steady magnetic field was described by C. Kittel in the Physical Review, volume 73, page 155, January 15, 1948. Kittel showed analytically that the steady magnetizing field required for resonance increases with the frequency of the microwave signal.

Since all rectangular waveguide modes contain components of magnetic field lying in the plane of the broad walls, the gyromagnetic elements are exposed to alternating fields perpendicular to the steady applied field and corresponding to each frequency being propagated.

This frequency absorption phenomenon is illustrated in FIG. 4 which indicates by way of example how frequencies of 4 or 10 kmc. might be absorbed by selecting the proper steady magnetic field strength to be applied to a gyromagnetic material. It would be possible to propagate a microwave signal through two gyromagnetic elements successively and abstract energy at a different frequency in each element. Alternatively, it would be possible to apply magnetic fields from two sources of different intensities to an elongated strip of gyromagnetic material and thus absorb microwave energy at each of the two frequencies. Each method would involve complicated and cumbersome structures. The microwave harmonic mode suppressor constructed according to the principles of the present invention overcomes these difficulties.

As shown by FIG. 4, for instance, unwanted signal of 4 kmc. could be absorbed in the section of gyromagnetic material adjacent to the larger ducts whereas signals of 10 kmc. could be absorbed in the sections of the gyromagnetic material adjacent to the smaller ducts. Desired signals of 2 kmc., for example, could be propagated through the suppressor with very little absorption.

Although a microwave harmonic mode suppressor has been described in order to illustrate a useful application of the principles of an invention, it will be appreciated that numerous applications are possible in a variety of microwave devices employing gyromagnetic material. Thus, the novel pole pieces of the present invention could be used to broadband conventional phase shifters and resonance isolators employing transversely biased gyromagnetic elements.

Furthermore, it is to be realized that the use of the novel pole piece is not restricted to microwave applications. In general, the pole piece can be used in any application requiring a specified gradient in magnetic flux density.

The novel pole pieces have been described as being comprised of ferromagnetic materials in which the permeability is greater than that of air. Although ferromagnetic materials are presently preferred for this purpose, it should be realized that diamagnetic materials in which the permeability is less than air could be used. In the case of diamagnetic materials, the web members would be designed to have a small cross sectional area adjacent to regions of high flux density, and a relatively large cross sectional area adjacent to regions of low flux density.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for providing a gradient in magnetic flux density comprising a north pole member and a south pole member, said north and south pole members terminating in flat faces parallel to but spaced from each other, a flat magnetically permeable pole piece disposed between the faces of said north and south pole members, said pole piece characterized in that it contains a plurality of ducts closely spaced in regions of desired low flux density and relatively widely spaced in regions of desired high flux density.

2. Means for providing a gradient in magnetic flux density comprising a north pole member and a south pole member, said north pole member terminating in a transverse flat face, said south pole member terminating in a transverse flat face parallel to but spaced from the flat face of said north pole member, a flat magnetically permeable pole piece disposed between the faces of said north and south pole members, said pole piece characterized in that it contains a plurality of ducts closely spaced in regions of low flux density and relatively widely spaced in regions of high flux density.

3. Means for establishing a magnetic flux gradient comprising a magnetic circuit containing an air gap, a magnetically permeable pole piece inserted in the air gap, said pole piece containing a plurality of transverse ducts closely spaced in regions of desired low flux density and relatively widely spaced in regions of desired high flux density, and fluid circulating means for passing a coolant through said ducts.

4. Means for providing a gradient in magnetic flux density comprising north pole and south pole members separated from each other so as to form an air gap, said north and south pole members further arranged to permit magnetic flux to extend across the air gap between said pole members, a flat magnetically permeable pole piece inserted in the air gap and contiguous with one pole member, said pole piece comprising a plurality of web members separated by transverse ducts, said web members being relatively thick adjacent to the regions of the air gap in which a high flux density is desired and relatively thin adjacent to the regions of the air gap in which a low flux density is desired, and fluid circulating means for passing a coolant through said ducts.

5. A microwave device comprisig a section of waveguide, a magnetically permeable pole piece extending longitudinally along said waveguide and having a surface forming a portion of the inside wall of said waveguide, gyromagnetic means disposed inside said waveguide in the region of said pole piece, means for establishing magnetic flux through said pole piece and said gyromagnetic means, said pole piece comprising a plurality of web members separated by transverse ducts, said web members being relatively thick adjacent to the regions of the gyromagnetic means in which a high flux density is desired and relatively thin adjacent to the regions of the gyromagnetic means in which a low flux density is desired, and fluid circulating means for passing a coolant through said ducts.

6. A microwave device comprising a section of rectangular, waveguide, a magnetically permeable pole piece extending longitudinally along one inside wall of said waveguide, gyromagnetic means disposed inside said waveguide between said pole piece and the opposite wall of said waveguide, means for establishing magnetic flux through said pole piece and said gyromagnetic means, said pole piece containing a plurality of internal ducts extending transversely across said waveguide, said ducts so constructed and arranged as to be relatively large and closely spaced adjacent to regions in the gyromatic means in which a low flux density is desired and relatively small and widely spaced adjacent to regions in the gyromagnetic means in which a high flux density is desired, and fluid circulating means for passing a coolant through said ducts.

7. A broadband harmonic suppressor comprising a section of rectangular waveguide, a magnetically permeable pole piece extending longitudinally along one inside wall of said waveguide, gyromagnetic means disposed inside said waveguide between said pole piece and the opposite wall of said waveguide, means for establishing magnetic flux through said pole piece and said gyromagnetic means, said pole piece containing a plurality of internal ducts extending transversely across said waveguide, said ducts so constructed and arranged as to be relatively large and closely spaced adjacent to regions in the gyromagnetic means in which a low flux density is desired and relatively small and widely spaced adjacent to regions in the gyromagnetic means in which a high flux density is desired, and manifold means for distributing coolant to the various ducts at a rate proportional to their relative size.

8. A broadband harmonic suppressor comprising a section of rectangular waveguide, a magnet constructed and arranged so as to establish a magnetic field across one transverse dimension of said waveguide, a pair of magnetically permeable pole pieces extending longitudinally along opposite walls of the waveguide in a region of the magnetic field, gyromagnetic means disposed between the pole pieces, said pole pieces each comprising an outer shell, a plurality of internal transverse web members separated by ducts, said web members being closely spaced in one region so as to provide a high flux density capable of biasing the adjacent gyromagnetic material to resonance at the highest frequency to be absorbed and relatively widely spaced in another region so as to produce a low flux density capable of biasing the adjacent gyromagnetic material to resonance at the lowest frequency to be absorbed, and fluid circulating means to pass coolant through said ducts.

9. A broadband harmonic suppressor comprising a section of rectangular waveguide, a magnet constructed and arranged so as to establish a magnetic field across the narrow dimension of said waveguide, a pair of magnetically permeable pole pieces extending longitudinally along the broad walls of the waveguide in the region of the magnetic field, gyromagnetic means disposed between the pole pieces, said pole pieces each comprising an outer shell, a plurality of internal transverse web members separated by ducts, said web members being closely spaced in one region so as to provide a high flux density capable of biasing the adjacent gyromagnetic material to resonance at the highest frequency to be absorbed and relatively widely spaced in another region so as to produce a low flux density capable of biasing the adjacent gyromagnetic material to resonance at the lowest frequency to be absorbed, and fluid circulating means to pass coolant over said web members.

10. A broadband harmonic suppressor comprising a section of rectangular waveguide, a magnet constructed and arranged so as to establish a magnetic field across the narrow dimension of said waveguide, a pair of magnetically permeable pole pieces extending longitudinally along the broad walls of the waveguide in the region of the magnetic field, gyromagnetic means disposed between the pole pieces, a plurality of internal transverse ducts in each pole piece, said ducts being relatively large and closely spaced in one region so as to provide a low flux density capable of biasing the adjacent gyromagnetic material to resonance at the lowest frequency to be absorbed and relatively small and widely spaced in another region so as to produce a high flux density capable of biasing the adjacent gyromagnetic material to resonance at the highest frequency to be absorbed, and manifold means to distribute coolant to the various ducts at a rate proportional to their relative size.

No references cited.